(12) United States Patent
Wollack et al.

(10) Patent No.: US 12,062,054 B2
(45) Date of Patent: Aug. 13, 2024

(54) BLOCKCHAIN TRACKING OF CARBON CREDITS FOR MATERIALS WITH SEQUESTERED CARBON

(71) Applicant: Newlight Technologies, Inc., Huntington Beach, CA (US)

(72) Inventors: Scott William Wollack, Costa Mesa, CA (US); Patrick Curran, Irvine, CA (US); Evan Randall Creelman, Costa Mesa, CA (US); Markus Donald Herrema, Huntington Beach, CA (US)

(73) Assignee: Newlight Technologies, Inc., Huntington Beach, CA (US)

( * ) Notice: Subject to any disclaimer, the term of this patent is extended or adjusted under 35 U.S.C. 154(b) by 186 days.

(21) Appl. No.: 17/617,769

(22) PCT Filed: Jun. 10, 2020

(86) PCT No.: PCT/US2020/036986
§ 371 (c)(1),
(2) Date: Dec. 9, 2021

(87) PCT Pub. No.: WO2020/252013
PCT Pub. Date: Dec. 17, 2020

(65) Prior Publication Data
US 2022/0237628 A1    Jul. 28, 2022

Related U.S. Application Data

(60) Provisional application No. 62/949,365, filed on Dec. 17, 2019, provisional application No. 62/861,929, filed on Jun. 14, 2019.

(51) Int. Cl.
*G06Q 30/018* (2023.01)
*G06Q 50/04* (2012.01)
*H04L 9/32* (2006.01)

(52) U.S. Cl.
CPC .......... *G06Q 30/018* (2013.01); *G06Q 50/04* (2013.01); *H04L 9/3247* (2013.01)

(58) Field of Classification Search
CPC ...... G06Q 30/018; G06Q 50/04; G06Q 40/03; G06Q 10/08; G06Q 10/10; G06Q 40/06;
(Continued)

(56) References Cited

U.S. PATENT DOCUMENTS

| 8,071,342 | B2 | 12/2011 | Herrema et al. |
| 2007/0192221 | A1 | 8/2007 | Sandor et al. |
| 2011/0146488 | A1 | 6/2011 | Jacob |
| 2019/0005507 | A1* | 1/2019 | Rodoni ............... B09B 1/00 |
| 2019/0108516 | A1* | 4/2019 | Jawaharlal ........... H04L 9/3239 |
| 2020/0076891 | A1 | 5/2020 | Stuart et al. |

FOREIGN PATENT DOCUMENTS

WO    WO 2016/112099    7/2016

OTHER PUBLICATIONS

The Framework of the Integration of Carbon Footprint and Blockchain: Using Blockchain as a Carbon Emission Management Tool Allen Hu, Tsai Chi Juo Jan. 2019 (Year: 2019).*
(Continued)

*Primary Examiner* — Alexandru Cirnu
(74) *Attorney, Agent, or Firm* — Knobbe, Martens, Olson & Bear, LLP

(57) ABSTRACT

Systems and methods are disclosed for tracking, via a blockchain registry, carbon credits in goods produced from materials with sequestered carbon. Materials with sequestered carbon may be produced by reacting greenhouse gases with air and other reagents and catalysts (including biological organisms). Following production of a batch of material with sequestered carbon, a blockchain entry may be recorded with production details and details of carbon-credits earned during production. The carbon-sequestering
(Continued)

material may later be converted into products, each of which may have a unique product identifier. A blockchain entry may be recorded with the unique product identifiers such that an owner of a unit of product can obtain, from the blockchain registry, a verified amount of carbon-credit associated with that unit.

21 Claims, 8 Drawing Sheets

(58) Field of Classification Search
CPC ........ G06Q 50/02; G06Q 50/28; G06Q 50/30; G06Q 50/26; G06Q 50/10; H04L 9/3247; H04L 9/3239; H04L 9/50; Y02P 90/30; Y02P 90/845; G06F 21/64
See application file for complete search history.

(56) References Cited

OTHER PUBLICATIONS

International Search Report and Written Opinion in PCT/US2020/036986 dated Aug. 26, 2020 in 14 pages.
Madden et al., "Introducing the Carbon Impact Factor," thejei.com, Jan. 31, 2016, in 17 pages, available at http://www.thejei.com/introducing-the-carbon-impact-factor/.
Sherry, "How Blockchain Can Make Carbon Markets More Accessible," ecosystemmarketplace.com. Oct. 2, 2018, in 3 pages, available at https://www.ecosystemmarketplace.com/articles/how-blockchain-can-make-carbon-markets-more-accessible/.
Nori, "A blockchain-based marketplace for removing carbon dioxide from the atmosphere," Version 3.0, Aug. 27, 2018.
Extended European Search Report for EP Application No. 20823446.8 dated Jun. 6, 2023 in 8 pages.

* cited by examiner

BLOCKCHAIN TRACKING OF CARBON CREDITS FOR MATERIALS WITH SEQUESTERED CARBON

PRIORITY AND INCORPORATION BY REFERENCE

This application is the U.S. National Phase Application under 35 U.S.C. § 371 of PCT/US2020/036986, filed Jun. 10, 2020, which claims priority to, and incorporates by reference, U.S. Provisional Application No. 62/861,929, filed Jun. 14, 2019, entitled "BLOCKCHAIN TRACKING OF CARBON CREDITS FOR MATERIALS WITH SEQUESTERED CARBON," as well as U.S. Provisional Application No. 62/949,365, filed Dec. 17, 2019, entitled "BLOCKCHAIN TRACKING OF CARBON CREDITS FOR MATERIALS WITH SEQUESTERED CARBON." Application PCT/US2020/036986 incorporates by reference, but does not claim priority to, U.S. application Ser. No. 15/182,542, filed Jun. 14, 2016 and entitled "SYSTEMS AND METHODS FOR CALCULATING, APORTIONING AND DISTRIBUTING CARBON CREDITS."

FIELD

The present specification generally relates to blockchain-based systems and methods for tracking carbon credits associated with materials with sequestered carbon, as well as for tracking environmental credits associated with the production of physical products.

BACKGROUND

Greenhouse gases (GHG) are those gases that can absorb and emit infrared radiation, but not radiation in or near the visible spectrum. The most abundant greenhouse gases in Earth's atmosphere are: water vapor ($H_2O$), carbon dioxide ($CO_2$), methane ($CH_4$); nitrous oxide ($N_2O$), ozone ($O_3$), and chlorofluorocarbons (CFCs). Atmospheric concentrations of greenhouse gases are determined by the balance between sources (emissions of the gas from human activities and natural systems) and sinks (the removal of the gas from the atmosphere by conversion to a different chemical compound).

A carbon credit (often called a carbon offset) is an instrument that often represents a certain amount of greenhouse gases removed or reduced from the atmosphere relative to a baseline and created from an emission reduction project. Carbon credits can be used by governments, industry, and private individuals to offset damaging carbon emissions that they are generating (or otherwise reduce carbon and carbon-equivalent emissions). Carbon credits may originate from a range of emission reduction activities or methodologies associated with the removal of existing emissions from the atmosphere and the reduction of future emissions. Carbon credits originated through these emission reduction activities can be created under a variety of voluntary and compliance market mechanisms and standards. In general, demand for carbon credits may provide financial support to emissions reductions projects.

A carbon credit may represent a certain amount, such as a metric ton, of $CO_2$ removed or reduced from the atmosphere. A carbon-equivalent credit, such as a $CO_2e$ credit, may represent a certain amount of another greenhouse gas, such as methane, where the amount that must be removed or reduced to earn a credit is adjusted based on the greenhouse warming impacts of the gas relative to $CO_2$. As an example, methane has, on a pound-for-pound basis, a climate impact approximately 25 times greater than $CO_2$ over a 100 year period or 72 times greater than $CO_2$ over a 20 year period. Thus, removing or reducing one ton of methane may earn an entity the same amount (or value) of carbon credits as removing or reducing twenty-five tons of $CO_2$ (e.g., if the carbon credits were awarded based on 100 year impacts).

While carbon credits and trading of carbon credits are a significant step forward in reducing overall carbon emissions, there is considerable paperwork and costs associated with measuring, certifying and selling carbon credits. Because of these difficulties, it is impractical for all but the largest corporations to engage in the trading of carbon credits. As a result, the vast majority of smaller carbon emission producers, such as small companies or individuals, effectively cannot participate in the traditional carbon trading regime.

SUMMARY

Aspects of the present disclosure enable individuals and smaller carbon emitters to participate in carbon credit trading, and the trading of environmental attributes. In one embodiment, carbon credits are created through the process of converting greenhouse gases into a bulk material, which is used in producing durable goods. A blockchain is used to verify and track sequestering of greenhouse gases into the bulk material that is used in producing durable goods. A purchaser of a particular durable good in this system can access the blockchain using identification information unique to that particular durable good to determine how many carbon credits (which may be a mere fraction of a single carbon credit) are associated with that particular good and, in some embodiments, to claim tradable ownership of those carbon credits. In one embodiment, an individual consumer is able to purchase a phyical product and concordantly also purchase the carbon credit or other environmental attribute associated with that physical product, and hold, sell, or trade that credit or attribute in an equity-like manner, similar to a share of corporate stock, thereby enabling participation by the individual consumer in carbon capture or environmental amelioration.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

Figure 1A:
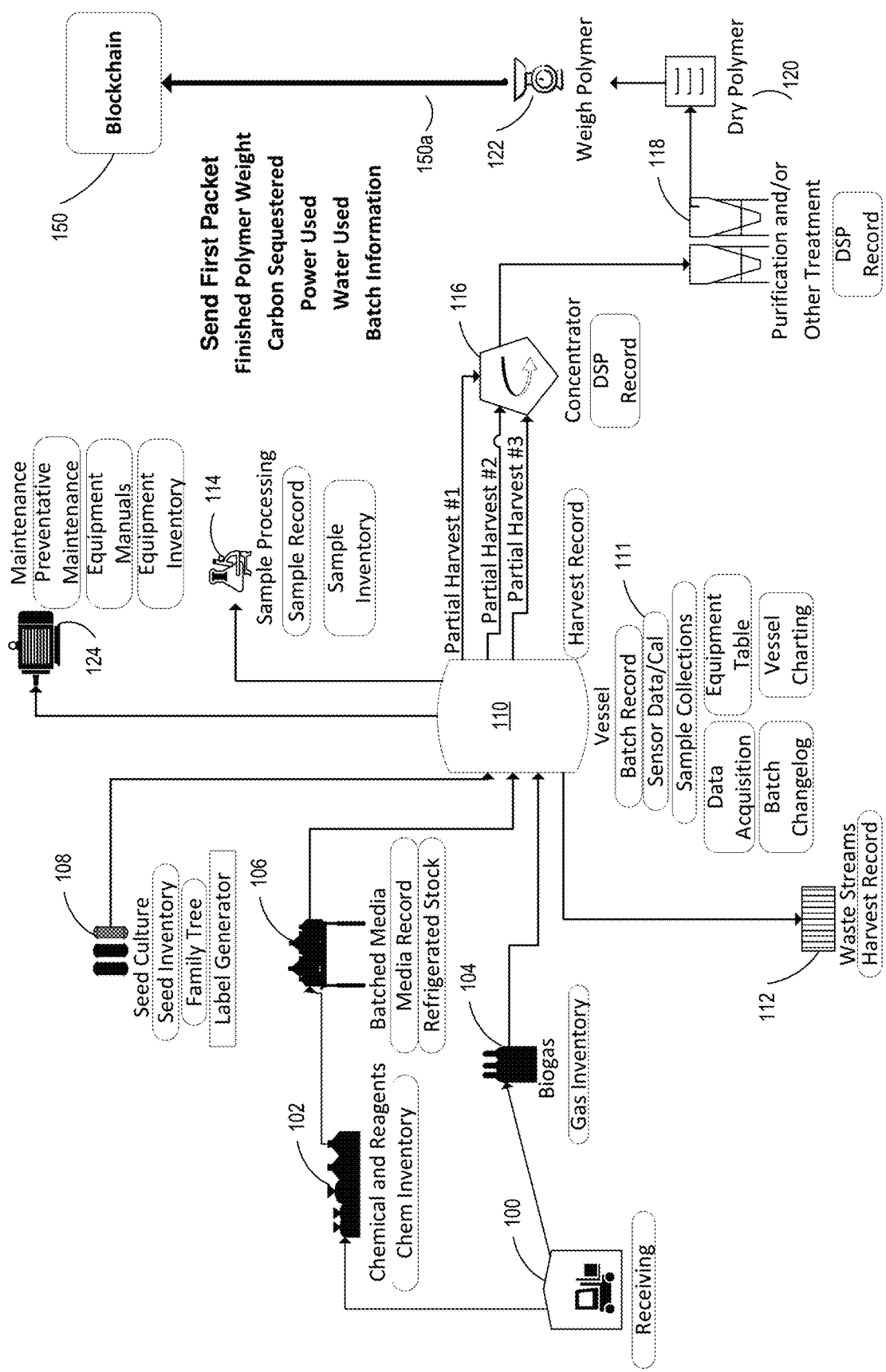
FIG. 1A is a schematic diagram showing illustrative processes involved in consuming carbon in the production of polymers and recording associated carbon-credit information in a blockchain.

Throughout the drawings, reference numbers may be re-used to indicate correspondence between referenced elements. The drawings are provided to illustrate example embodiments described herein and are not intended to limit the scope of the disclosure.

DETAILED DESCRIPTION

While the theory of using carbon credits is a potential solution to carbon emissions, there is a need for a way to implement and operate such a solution so that smaller carbon emitters, such as individual consumers, are also able to participate in carbon credit trading, rather than just large corporations and governments. Aspects of the present disclosure address this need in various manners, including a method of creating carbon credits by converting greenhouse gas emissions into useful compounds used in the manufacture of durable goods, associating a percentage of those carbon credits based on weight to the durable good and transferring title to the carbon credits associated with a durable good to the purchaser of the durable good. Still further there exists a need for an improved carbon trading system which makes it possible for individuals and smaller carbon emitters to participate in carbon credit trading.

Generally described, aspects of the present disclosure relate to tracking carbon credits for materials with sequestered carbon using distributed ledgers, such as blockchain ledgers. During production of the materials, greenhouse gases such as methane and/or carbon dioxide are destroyed (or sequestered) through the conversion of methane to carbon dioxide, carbon dioxide to oxygen, and other processes. Various sensors and user input devices may monitor a production process and record production details such as the weight of material produced, the amount of greenhouse gas destroyed or sequestered, the amount of power used (e.g., electricity, fuel, or other resources consumed during production), the amount of water used in production, working conditions (e.g., the average wages and average working hours of workers involved in production of the carbon-sequestering raw materials), other production inputs, an expected rate of decay of the carbon-sequestering matter, and batch information (e.g., identification information), as examples. Production details for a batch of material may be memorialized and recorded via one or more blockchain entries in a blockchain ledger. Various sensors and user input devices may monitor and record, via one or more additional blockchain entries in the blockchain ledger, details of subsequent fabrication of products from the materials. The additional blockchain entries can include unique product identifiers that associate each product with a batch of material. In some embodiments, carbon credits associated with the production of the batch of materials may be divided amongst the individual products. These and other aspects of the present disclosure may enable an owner of one or more of the products to track and claim ownership of a properly divided share of the carbon credits generated from production of the carbon-sequestering material those products were produced from. In some embodiments, aspects of the present disclosure may additionally enable an owner of a product to view the results of a life-cycle assessment (LCA), which may also be referred to as a life-cycle analysis, for that product that is supported by a verified tracking of the various inputs to the LCA as recorded in the blockchain ledger. It will be appreciated that the given variant of LCA performed may depend on the embodiment. For example, the LCA performed in one embodiment may be a "cradle to grave" approach (such as an assessment including use of the product and through to the displosal of the product), while in another embodiment a "cradle to gate" approach (such as an assessment up to a point prior to transport of the product to a consumer) may be employed.

Figure 1B:
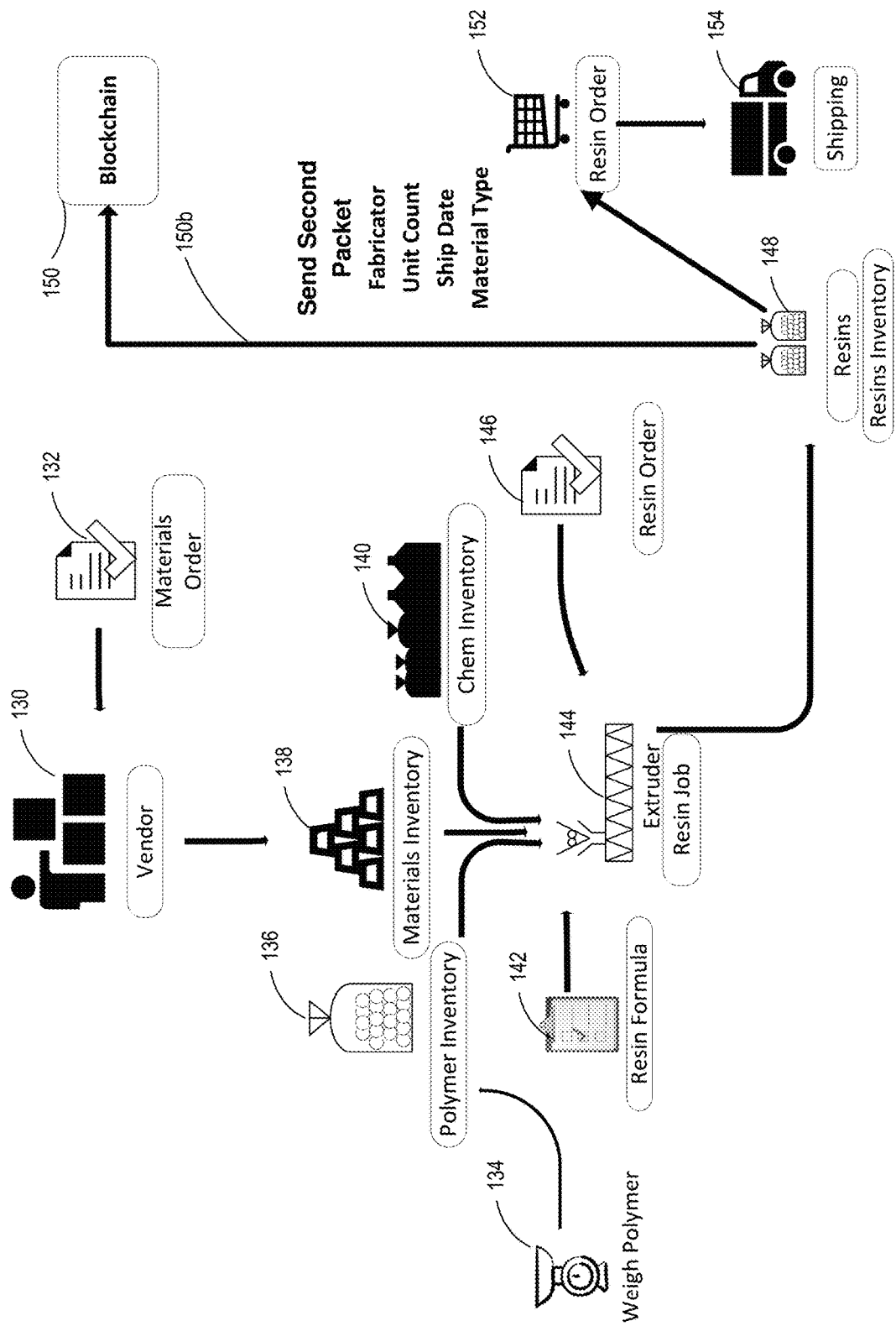
FIG. 1B is a schematic diagram showing illustrative processes involved in producing resins from the polymers and recording associated carbon-credit information in the blockchain.
Figure 1C:
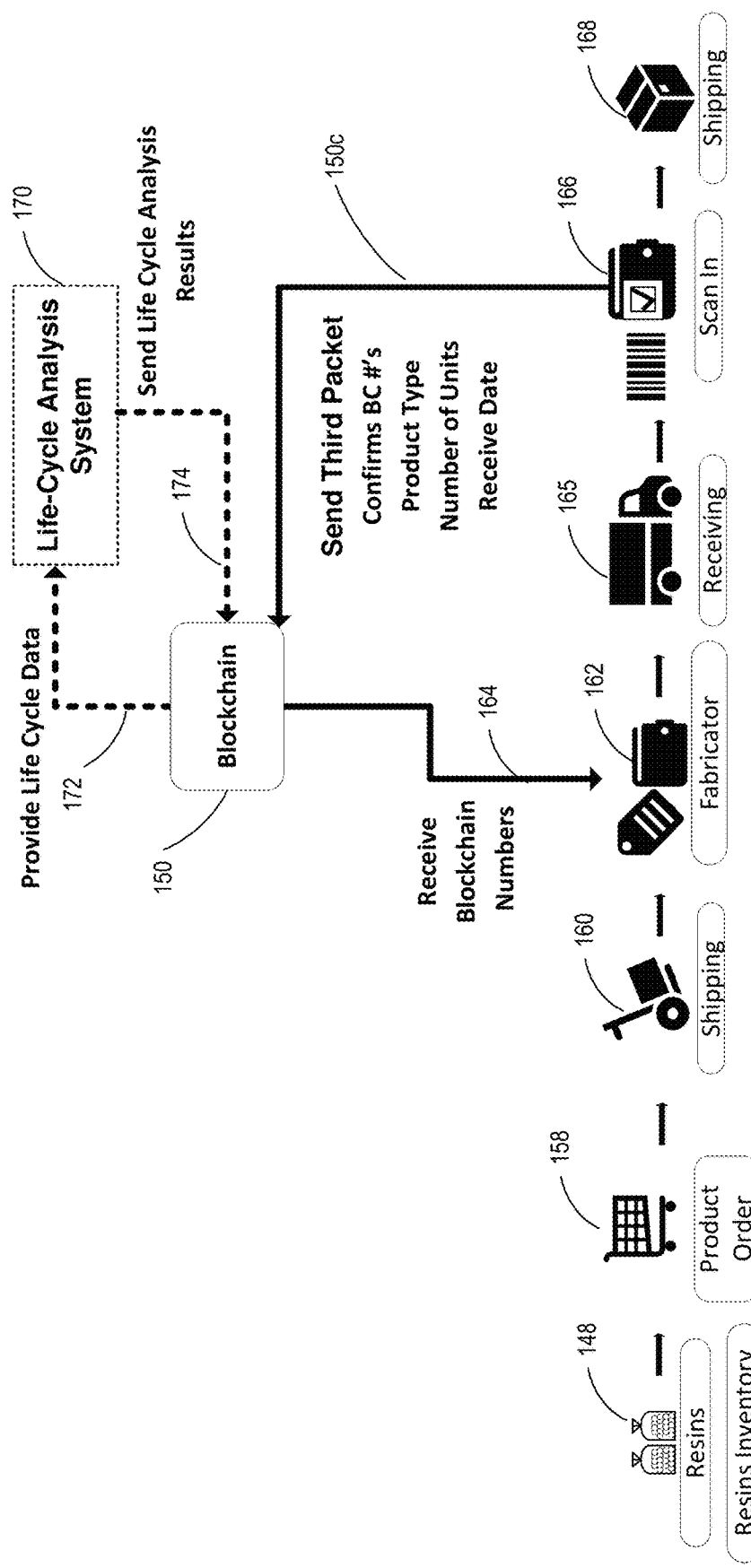
FIG. 1C is a schematic diagram showing illustrative processes involved in fabricating products from the resins and recording per-product carbon credit information in the blockchain.

As will be discussed in further detail, FIGS. 1A-1C illustrate example processes that may facilitate the production of carbon-sequestering products and to record proper percentages of carbon credits for each product.

FIG. 1A is a schematic diagram showing illustrative processes that may occur at a producer of carbon-sequestering material, including monitoring the production process and recording information related to carbon-credits and production of the materials in a blockchain 150 in an automated manner.

Receiving operations 100 may receive and store chemicals and reagents 102 and a carbon-containing gas such as, but not limited to, biogas 104, flue gas, natural gas, methane emissions from coal mines, carbon dioxide sequestered from air, air, landfill gas, etc. In at least some embodiments, biogas 104 may be methane or carbon dioxide collected from carbon emitters (e.g., methane from agricultural or municipal waste, carbon dioxide from energy facilities, carbon dioxide from direct air capture, methane from landfill emissions, etc.). If desired, the chemicals and reagents 102 may be processed into batched media 106. While the present application generally refers to the carbon-containing gas as "biogas," the present disclosure is equally applicable to non-biologically-generated carbon-containing gases and any reference to biogas should be understood as alternatively referencing such non-biologically-generated carbon-containing gases. In at least some contexts herein, biogas may refer to any greenhouse gas regardless of source.

The biogas 104 may be processed in a reaction vessel 110, along with some of batched media 106 and seed culture 108. The seed culture 108 may be a micro-organism or other catalyst that converts the biogas 104 into a useful product such as one or more proteins and/or a plastic polymer in a fermentation-like process. The producer may also circulate air through the reaction vessel such that oxygen in the air can be a reagent within the reaction vessel 110. The resulting reaction products may include proteins and/or thermoplastic polymers such as polyhydroxyalkanoates (PHAs), with carbon from the biogas 104 effectively sequestered within the polymers. In some embodiments, the polymer produced in the arrangement of FIG. 1A is, by weight, approximately 40% oxygen from air and approximately 60% carbon from biogas 104.

As illustrated by waste streams 112, waste products from the reaction may be properly disposed of. Additionally and as illustrated by maintenance 124, maintenance may be routinely performed for all relevant components and maintenance records may be kept. In some embodiments, records of waste products and maintenance operations may also be recorded in the blockchain 150 for later use in life-cycle analysis, auditing and other purposes (e.g., as part of a first packet 150a, or as part of another packet).

During and after processing in reaction vessel 110, samples of the reaction products may be taken, processed, and analyzed as shown by sample processing 114. Records of the samples may be kept and, if desired, may be included within the first packet 150a, which will be described in more detail below.

Upon determining that processing in reaction vessel 110 is sufficiently complete, the reaction products within reaction vessel 110 may be harvested and, as needed, further processed. In the example of FIG. 1B, the proteins, polymers, and/or other reaction products are harvested in three separate batches, each of which is concentrated (e.g., to remove excess liquids) in concentrator 116. Concentrator 116 may generate concentrator records, which may be included within first packet 150a. The polymers and any remaining reaction products may be treated or purified by treatment 118, dried by dryer 120, and weighed by scale 122. In some embodiments, different arrangements of post-processing (e.g., after processing in reaction vessel 110) may be performed. Following weighing of the polymer, protein, or other reaction product, the producer may send first packet 150a to blockchain 150 (e.g., to a series of blockchain nodes maintaining a distributed blockchain ledger).

The first packet 150a may include information such as the finished weight of polymer (or other product such as protein), the amount of carbon dioxide (or other greenhouse gas) destroyed or otherwise sequestered, the amount of power used, and batch identification. In at least some embodiments, the first packet 150a is cryptographically signed by the entity responsible for the production of the polymer (e.g., in order to certify the contents of the packet in the name of the producer). In some other embodiments, the first packet 150a is cryptographically signed, partly or fully, by various automated sensors that recorded information within the first packet 150a. As examples, the scale 122 may cryptographically sign a data block containing the finished polymer weight, energy monitors may cryptographically sign data blocks indicating the amount of power consumed, and biogas sensors that monitor the consumption of biogas in the reaction vessel 110 may cryptographically sign data blocks indicating the amount of biogas consumed. If desired, tamper-proof or tamper-resistant versions of the various sensors may be provided to further increase the integrity and resistance of the system to user tampering. The automated sensors, in some embodiments, may be configured to cause data writes to a secure local database via supervisory control and data acquisition (SCADA) system components or software, from which a computing system may then access the secure local data to generate associated write requests to the blockchain. An example of a first packet 150a will be further described below with reference to example JSON data. The first packet 150a may also be referred to as a polymer packet, in some embodiments.

In at least some embodiments, some or all of the equipment described in FIG. 1A may be automated and/or may include sensors that record information regarding the processing of biogas 104 and other reactants into finished polymer. As an example, the reaction vessel 110 may include sensors 111 that measure and record the amount, quality, and/or type of air, chemicals and reagents 102, biogas 104, batched media 106, and/or seed culture 108 input into the reaction vessel 110 for a given batch of polymers. Additionally, sensors 111 may measure and record conditions within the pressure vessel 110 during processing (e.g., temperature, pressure, weight, etc.) and may measure and record electrical consumption. As additional examples, any refrigerators or other power-consuming equipment may include power monitors (e.g., if the batched media 106 is stored in a refrigerator, the power consumption of that refrigerator may be measured and recorded).

As yet more examples, the concentrator 116, treatment equipment 118, dryer 120, and/or scale 112 may include sensors for measuring relevant properties of the reaction products (e.g., the concentrator may record the weights of inputs and outputs and the scale 122 may record the weight of finished polymer). In at least some embodiments, the entirety (or nearly the entirety) of the production process is automatically monitored and relevant sensor readings automatically recorded. Such embodiments may help to avoid user error and ensure users do not fraudulently alter production records (e.g., to ensure an operator does not falsify, in order to claim unearned carbon credits or some other nefarious reason, the amount of power used, the amount of biogas consumed, the amount of polymer produced, etc.). The accuracy and functioning of the automated sensors may be periodically audited, such as by a third party auditor. Such automation and monitoring may increase the integrity of the blockchain records (e.g., increase trust in the system that blockchain records of carbon credits are true and accurate).

Following production of a polymer (such as described in connection with FIG. 1A), a vendor, or other entity, may reprocess the polymer, optionally adding additional materials, to produce an intermediate product such as a thermoplastic resin. FIG. 1B is a schematic diagram showing illustrative processes that may occur at such a vendor.

As shown in FIG. 1B, vendor 130 may receive a materials order 132 or a resin order 146, requesting shipment of specified carbon-sequestering materials or resins. Upon receipt of an order, the vendor may combine polymers from polymer inventory 136, with optional materials from materials inventory 138, and with various chemicals 140 in accordance with a resin formula 142 or some other recipe. The combined materials may be passed through an extruder 144 to produce carbon-sequestering materials such as resins 148. The resin order 152 may then be fulfilled by shipping 154 the appropriate amount of resins to a customer.

In at least some embodiments, vendor 130 may send a materials packet such as second 150b. Second packet 150b may include any desired information including, but not limited to, the identity of the vendor (sometimes referred to as a fabricator), a unit count, an indication of the amount of polymer used, an indication of the amount of resins products, a production date, a ship date, a type of carbon-sequestering material or resin produced, and an amount of power consumed by the vendor during processing of the polymer. As discussed in connection with FIG. 1A, data in the packet 150b may be collected by various automated sensors to isolate the system from the potential of user manipulation. Additionally, data in the packet 150b may be cryptographically signed by a computing system of the vendor 130 and/or by various sensors collecting data within the packet.

An example of a second packet 150b will be further described below with reference to example JSON data. The second packet 150b may also be referred to as a materials packet, in some embodiments.

As shown in FIG. 1C, fabricator 162 may receive a product order 158, requesting shipment of products made with the carbon-sequestering polymer and/or resins products in FIGS. 1A and 1B. The resins 148 may be shipped by shipping service 160 to the fabricator 162.

Fabricator 162 may process the resins 148 into useful products. In at least some embodiments, the resins 148 may be thermoformed into useful products including, but not limited to, packaging films, golf tees, paper and board coatings, housings (e.g., for electronic items), hygiene articles, utensils, fibers, fabrics, blow molded, extruded, injection molded, foamed articles, and/or many others. In general, the resins 148 may have similar physical properties as fossil fuel-based thermoplastics and may therefore be used in forming most, if not all, products previously made of fossil fuel-based thermoplastics. After the fabricator 162 fabricates a plurality of unique products, the products may be sent to receiving 165 and eventually shipped by a shipping service 168 to a customer. In some embodiments, information regarding environmental impacts associated with the receiving 165 and shipment 168 processes (such as mileage tracking and/or fuel consumed in transporation) may be tracked and provided to the blockchain 150 for subsequent use in a life-cycle analysis performed by the life-cycle analysis system 170.

In other embodiments, carbon-sequestering materials other than polymers and resins may be created such as carbon-sequestering proteins. Additionally, final useful products, which may include anything that ends up in a final product, such as a leather good, cutlery, etc., may be created from carbon-sequestering proteins, carbon-sequestering polymers, carbon-sequestering resins, and/or other carbon-sequestering materials. In other embodiments, such embodiments may also be assigned with other environmental attributes, such as a quantifiable and product-specific credit associated for reductions in water, energy, and/or other environmentally impactful inputs or impacts.

Fabricator 162 may, if desired, apply unique product identifiers to each product produced from the carbon-sequestering resins or, alternatively, may include unique product identifiers in materials (e.g., manuals, inserts, etc.) included with each product or the packaging applied to each product. As examples, the fabricator 162 may print a unique barcode, QR code, or other code onto each product or onto something included with each product. As another example, the fabricator 162 may embed a unique code (which may be in the form of a graphical code, such as a barcode or QR code, or a printed number or alphanumeric string) into a surface of each product. In general, the unique code associated with each product may take any form such as, but not limited to, numeric codes, alphabetic codes, symbolic codes, pictoral codes, dates, chemical markers, biological markers, nuclear markers, other unique identifiers, and combinations of these and other identifying techniques. In other embodiments, the unique code may be embodied in a radio-frequency identification (RFID) tag embedded in or otherwise associated with a product or packaging of a product. The unique code may, in at least some embodiments, serve to identify (such as indirectly, by being capable of serving as a lookup key in a blockchain), for each unit of product, a respective amount of carbon-credits associated with that unit of product (e.g., where the amount is based on the amount of carbon-credits generated by the production of the batch of carbon-sequestering polymer forming the identified unit of product and also based on the percentage of that batch that is incorporated into a single unit of product).

As shown in FIG. 1C, one or more blockchain nodes maintaining the blockchain 150 may provide the unique product identifiers, referred to as blockchain numbers 164 in FIG. 1C, to the fabricator 162. In other embodiments, the fabricator 162 may be responsible for generating the unique product identifiers and may send the unique product identifiers to the blockchain 150, e.g., as part of the third packet 150c. In at least some embodiments, the unique product identifiers may be generated with at least one random or pseudo-random input. The unique product identifiers may, in some embodiments, each be a globally unique identifier (GUID) or universally unique identifier (UUID) with respect to all other identifiers used in blockchain entries across a number of different fabricators.

At some point in the fabrication process, fabricator 162 may send a packet such as third packet 150c to the blockchain 150 (e.g., via an API or other method that results in one or more blockchain nodes writing to the node's copy of a distributed ledger). Packet 150c may include information such as the unique product identifiers (also referred to as blockchain numbers) applied to the products, the type of product, the number of units, the production date, the expected lifetime of the product, and the ship date. In some embodiments, the packet 150c may additionally include mileage, fuel consumed, and/or other data associated with shipment and other movement of the product and its component parts up to the shipment of the product 168. The packet may be cryptographically signed by the fabricator 162 and/or one or more automated sensors at the fabricator 162. As an example, the fabricator 162 may include a scan-in device 166 that scans the unique product identifiers and generates the third packet 150c.

An example of a third packet 150c will be further described below with reference to example JSON data. The third packet 150c may also be referred to as a product packet, in some embodiments.

In some embodiments, the first, second, and third packets 150a, 150b, and 150c may include and enable tracking of additional information. As examples, each of these packets may record and enable tracking of social impacts of the production process, such as the average labor wage and working week hours of workers (e.g., workers involved in production of raw carbon-sequestering materials, workers involved in production of intermediary products, workers involved in production of end products), water usage at each stage of production, energy usage at each stage of production, other environmental impacts at each stage of production, ownership history (e.g., of the raw, intermediate, or end materials), etc.

In some embodiments, data from the blockchain 150 (such as data associated with the first, second, and third packets 150a, 150b, and 150c) for a particular product may be provided to a life-cycle analysis system 170, which may be operated by or associated with a life-cycle analysis service or auditor. For example, the blockchain 150 may store sufficient data in some embodiments that a life-cycle analysis auditing service may complete a life-cycle analysis for the product based on the verified data within the blockchain. The result of the life-cycle analysis 174 as generated by the life-cycle analysis system 170 may also be placed in the blockchain 150 and associated with the corresponding unique product identifier, such as including a certificate or other verified information reflecting the results of the life-cycle analysis.

The life-cycle analysis may be based on environmental impacts associated with the life of the product as determined from the information included in a plurality of ledger entries associated with the corresponding unique product identifier stored in the ledger(s). In an example embodiment, the inputs associated with a given product that are provided from the blockchain 150 to the life-cycle analysis system 170 may include but are not limited to one or more facility names, facility address, electricity purchased, steam purchased, natural gas used, light fuel oil used, heavy fuel oil used, propane used, water withdrawn, water discharged, net water use, the amount of air emissions by type (which may include the amount of each of various greenhouse gases, such as $CO_2$, CO, $CH_4$, $N_2O$, HFCs, etc.), recycled wastes, wastes that are sold, non-hazardous wastes produced, hazardous wastes produced, and/or other data.

Figure 2:
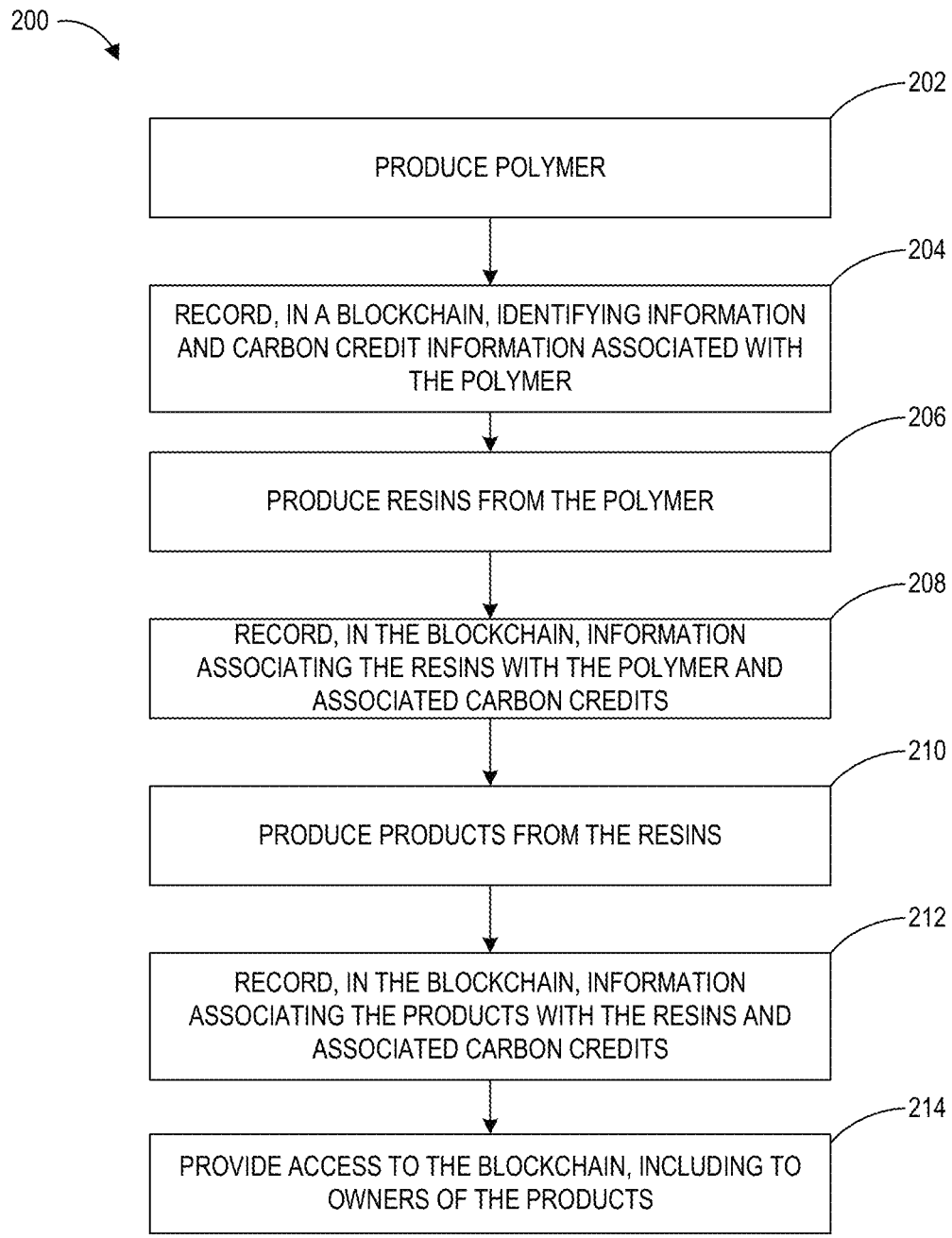
FIG. 2 is a flow diagram of an illustrative method for tracking carbon credits on a per-unit basis for products made from polymers.

FIG. 2 is a flow diagram of an illustrative method 200 for tracking carbon credits on a per-unit basis for products made from polymers. The illustrative method 200 begins at block 202, where a producer creates a polymer (or other material) in a process that destroys or sequesters greenhouse gases. Since the production of the polymer process destroys or otherwise sequesters greenhouse gases (in an amount that exceeds the carbon emissions associated with production such as the electrical consumption), the production results in a net reduction of greenhouse gases in the atmosphere and can earn the producer carbon-credits.

Next, at block 204, information associated with the production of the polymer is recorded via at least one entry into a blockchain ledger. As examples, each batch of polymer may be recorded via one or more blockchain entries that include details such as the weight of polymer produced, the amount of greenhouse gas destroyed or sequestered, the amount of power (e.g., electricity, natural gas, etc.) used, batch identification information, the identity of the producer, information from or about production sensors (such as automated equipment that records how much polymer was created, how much in greenhouse gases were sequestered or destroyed, etc.), and/or other desired information.

At block 206, a producer may create resins from the polymer produced in block 302. As an example, an entity may process the polymer produced in block 302 (e.g., with chemicals, via heating, via extrusion, or via other suitable processes) into extruded resin or another intermediate product for later use by manufacturers.

At block 208, information associated with the production of the resins (or other intermediate product) is recorded via at least one entry into the blockchain ledger. As examples, each batch of resin may be recorded via one or more blockchain entries that include details such as the identity of the producer, the number of resin pieces produced, the weight of resin produced, another indication of quantity of resin produced, a production date, a ship date, the type of resin produced, the amount of power consumed, and other desired information.

In at least some embodiments, the blockchain entries recorded at block 208 are associated with (e.g., reference or are otherwise tied to) the blockchain entries recorded at block 204 such that the particular polymers used in creating a batch of resins is known and recorded. With arrangements of this type, it may be possible to track the carbon-credits (earned during production of the polymers) even after the polymers are re-formed or processed into other products such as resins. Thus, an owner of the resins may be able to determine how many carbon credits were earned in production of the source-material (i.e., the polymers). In various embodiments, ownership of the carbon-credits may also be tracked with the blockchain ledger and recording entries at block 208 may involve transferring ownership of carbon-credits from the polymer-producer to the resin-producer (e.g., in an amount determined by the amount of polymer used by the resin-producer).

At block 210, a manufacturer or other entity may produce products using the resin (or, if steps 206 and 208 are omitted, using the polymer). In some embodiments, the manufacturer may use the resin to form end products (e.g., plastic smart-phone cases, packaging material, hand tools, utensils, or other products made wholly or partially with plastics). The polymer and resins may be an alternative to oil-based plastics having similar physical properties and, as such, may be used in manufacturing many, if not all, products typically manufactured using oil-based plastics. Block 210 may involve obtaining unique product identifiers for each unit of product produced and, in some embodiments, involve placing a unique product identifier on, in, or with each product (e.g., by stamping a code into the product, by printing a barcode, QR code, or other identifier on the product, by including a product code on a printing packaged with the product, etc.). It should be noted that while the present application refers to some products, such as those produced in block 210, as "end" products, this is merely a convenient label and, in general, such products may be further processed, be combined with other products, or otherwise be transformed.

At block 212, information associated with the production of the products (produced in step 210) is recorded via at least one entry into the blockchain ledger. As examples, the blockchain entries recorded at block 212 may include any unique product identifiers, the type of product, the number of units of product produced, the production date, the ship date, etc. The blockchain entries may also be tied to (or otherwise associated with) the blockchain entries recorded at blocks 204 and 208. In particular, the blockchain entries may be tied together such that an entity may be able to use the unique product identifier for a given unit of product to identify the blockchain entry for that unit (or for the batch of units including that unit) and identify the corresponding entry (or entries) for the intermediate resin and the original polymer. In some embodiments, the carbon-credits associated with production of the polymer may be tracked and split (or even combined) such that amount of carbon-credit associated with a single unit can be determined.

At block 214, blockchain nodes may provide access to the blockchain, including to owners of the products produced in step 210 and to other interested parties. For example, a number of different computing systems operated by different entities may host separate copies of a distributed ledger (where each such computing system may be considered a different blockchain node), any one of which may be configured to respond to requests to retrieve information from the blockchain if sufficient information (such as authorization information, if required in the given embodiment) has been provided in association with the request, according to known methods in the field of blockchains and other distributed ledgers. Block 214 may include, as an example, receiving a unique product identifier for a product produced from polymer, determining from the blockchain entries an amount of carbon-credit uniquely associated with that product identifier, and providing a verified indication to the requestor of the amount of carbon-credit uniquely associated with that product identifier. Such requests may come via an API in some embodiments, such as an API provided by an operator of a blockchain node to enable software applications or websites to request data from a blockchain as described herein.

Figure 3:
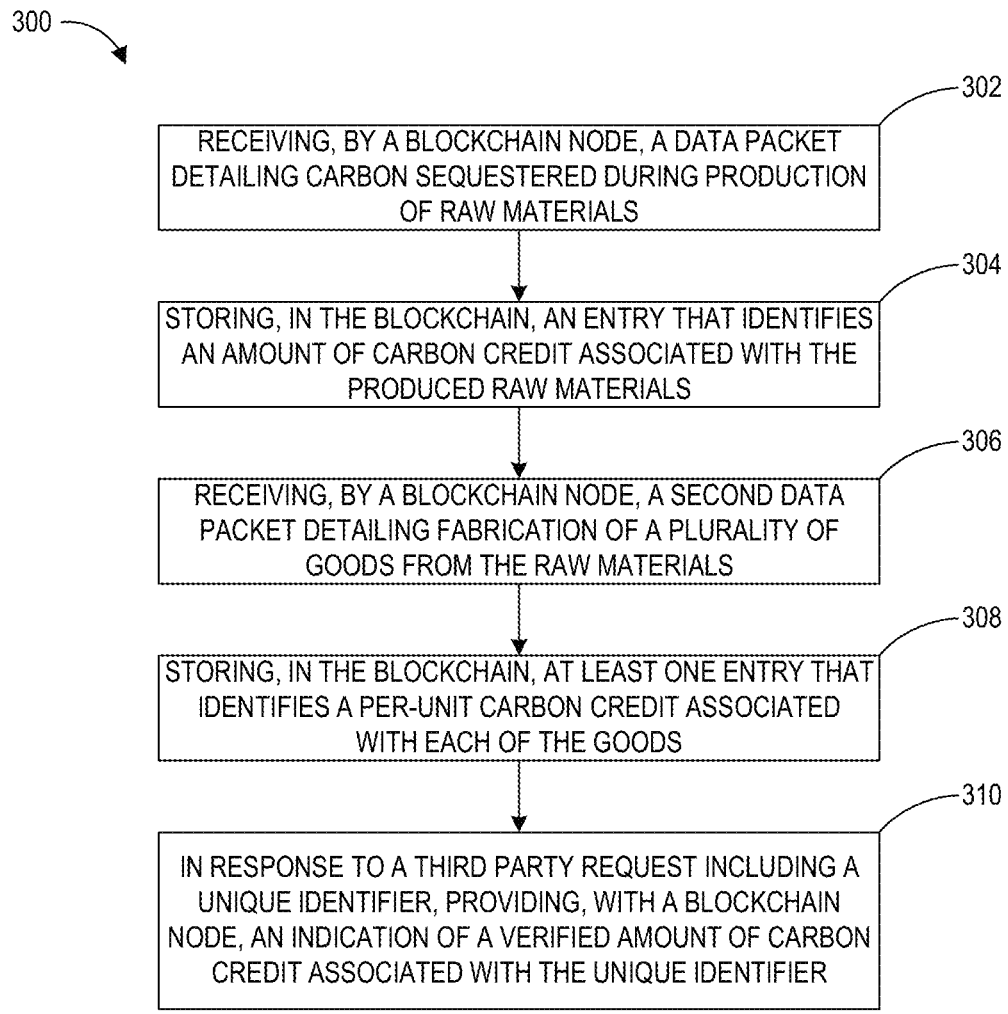
FIG. 3 is a flow diagram of another illustrative method for tracking carbon credits on a per-unit basis for products made from polymers.

Another method for tracking carbon credits on a per-unit basis is shown in FIG. 3, which is a flow diagram of an illustrative method 300. The illustrative method 300 begins at block 302, where a blockchain node receives at least one data packet detailing carbon sequestered during production of raw materials such as a polymer or one or more proteins. The packet received in block 302 may be, as an example, a packet such as first packet 150a of FIG. 1A. The packet received in block 302 may include information such as a finished weight of raw materials, an amount of carbon-dioxide (or other greenhouse gas) consumed (e.g., destroyed or otherwise sequestered), an amount of power used, an amount of greenhouse gases produced as a result of the production, and identification information such as information identifying a batch of raw materials or identifying the producer of the raw materials, as examples (though not each is required in every embodiment).

At block 304, one or more blockchain nodes may store, in their copy of a blockchain ledger, at least one entry that identifies an amount of carbon credit associated with the produced carbon-sequestering raw materials. The entry stored in block 304 may be based on the data packet(s) received in block 302. In at least some embodiments, the amount of carbon credit may be determined (by a blockchain node, by the producer, or by any other suitable party) based at least on the amount of carbon-dioxide (or other greenhouse gas) consumed and based on the amount of power used (e.g., any carbon credit earned from sequestering greenhouse gases may be reduced by any greenhouse gas emissions generated by the production such as through the consumption of electricity).

At block 306, a blockchain node receives at least one second data packet detailing fabrication of a plurality of goods from the raw materials. The packet received in block 306 may be, as an example, a packet such as third packet 150c of FIG. 1C. The packet received in block 306 may include information such as a plurality of unique product identifiers, a product type, a number of units of goods produced, and a production date, as examples. In some embodiments, the packet received in block 306 and the associated entry stored in block 308 may detail fabrication of an intermediary good, rather than a final product. In embodiments with multiple stages of intermediary goods, blocks 306 and 308 may be repeated for each stage of fabrication. In these and other embodiments, a final iteration of blocks 306 and 308 may be performed for the fabrication of final goods from the final intermediary product. In this manner, the final goods (and any intermediary goods) can be traced back to an associated entry stored in block 304, thus facilitating tracking of carbon sequestered in the final goods (and any intermediary goods).

At block 308, one or more of the blockchain nodes may store, in their copy of the blockchain ledger, at least one entry that identifies a per-unit amount of carbon credit associated with each of the produced goods. In at least some embodiments, the per-unit amount of carbon credit is determined based on what fraction of the raw materials are incorporated into each unit of goods and based on other relevant factors such as the amount of greenhouse gases produced during production of the goods. Additionally, the entry stored in block 308 may include one or more unique product identifiers and may be tied to the entry stored in block 304.

At block 310, a blockchain node may, in response to a third party request including a unique product identifier, provide an indication of a verified amount of carbon credit associated with the unique product identifier. As an example, the blockchain node may identify relevant entries (e.g., one or more of the entries stored in blocks 304 and 308) that tie the unique product identifier to a particular batch of raw materials, may determine, based on the relevant entries, the amount of carbon credit uniquely associated with the unique product identifier, and may provide a response to the third party with the amount of carbon credit uniquely associated with the unique product identifier.

In at least some embodiments, production of carbon-sequestering raw materials may occur in a continuous process as opposed to a batch process. In some embodiments with continuous production processes, the outputted carbon-sequestering raw materials may be divided into batches, each of which has at least one associated blockchain entry to facilitate a traceable link between units of final product and the batch of carbon-sequestering raw materials those units were produced from. In other embodiments with continuous production (or in some embodiments with batch production), blockchain entries may not identify specific batches of raw material and thus there may not be a traceable link between a given unit of final product to a particular batch of raw material. In such embodiments, modified versions of the blockchain entries may be stored in blocks 304 and 308. As an example, the blockchain entry stored in block 304 may indicate an amount of carbon credit associated with the produced carbon-sequestering raw materials as a function of some measurable quantity such as volume or weight (e.g., the blockchain entry may indicate that every 100 grams of raw material is associated with a specified amount of carbon credits, which may be based on average production values for greenhouse gas consumption and power consumption). In such an example, the blockchain entry stored in block 308 may indicate the per-unit amount of carbon credit based on the per-unit weight (or volume) of carbon-sequestering raw material incorporated into each unit of goods and based on the amount of carbon credits per a specified weight (or volume) of the raw material.

Figure 4:
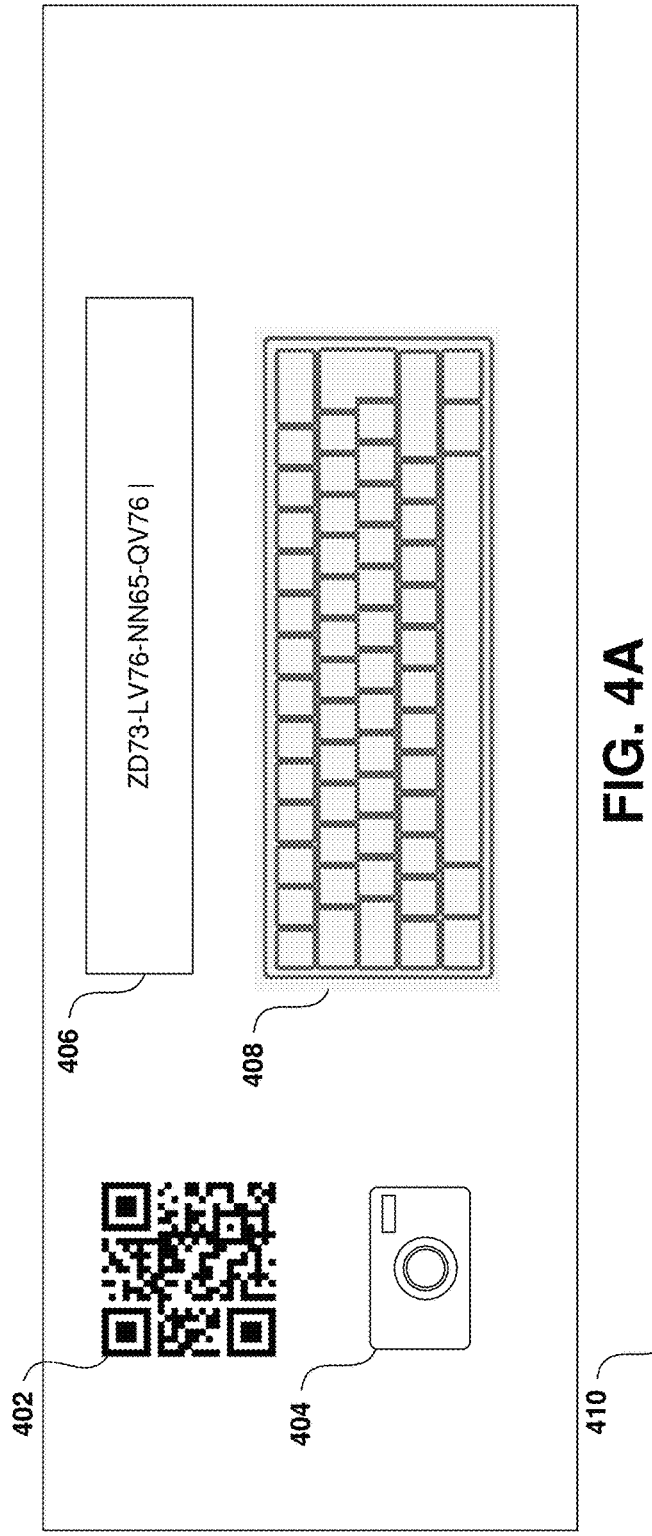
FIG. 4A illustrates example techniques for providing a unique product identifier to retrieve an entry in a blockchain ledger.
FIG. 4B illustrates an example user interface that provides an indication of a verified amount of carbon credit associated a unique product identifier.

A user of at least one unit of product made from the materials, as described herein in connection with FIGS. 1A-1C, or another interested party, may be able to verify an amount of carbon-credits associated with the unit (or units). An owner of the unit(s) may be able to claim ownership of the carbon-credits and may be able to sell those carbon-credits to another party. In some embodiments, the user (or other party) may be able to use unique product identifiers (of the type described in FIG. 1C) to retrieve carbon-credit records from the blockchain ledger described herein. FIGS. 4A and 4B illustrate example techniques for providing unique product identifiers to a blockchain system and illustrate an example response that the blockchain system may provide, including an indication of a verified amount of carbon credit associated with the provided unique product identifiers.

FIG. 4A illustrates how a user may use camera 404 (such as a digital camera integrated into a mobile phone) to capture a QR-code identifier 402 or a keyboard 408 to enter an alphanumeric identifier 406. The QR code may be captured from a photographic capture of a product itself that includes the QR code printed or etched thereon, or from a photographic capture of the product's packaging or associated insert that includes the QR code. The QR code 402 may represent an alphanumeric string such as that shown as alphanumeric identifier 406. In some embodiments, there may be no QR code or barcode on the product or packaging, but rather a printing of the alphanumeric identifier 406 may appear on the product or packaging, which the user may then read and type using keyboard 408. The identifier 402 or 406 may then be provided to the blockchain system described herein, where the identifier is used to determine an amount of carbon-credits unique associated with the provided identifier. The identifier may be entered into a text field within a software application or website that communicates on the backend with a blockchain node, where the software application of website then generated a response discussed below with respect to FIG. 4B.

As shown in FIG. 4B, the blockchain system may provide an indication of a verified amount of carbon credit associated with the provided identifier. The verified amount of carbon credit may be displayed on display 410 (e.g., which may be part of user device(s) 602, which are further described in connection with FIG. 6). In some embodiments, additional information may be displayed by the user device, such as the results of a life-cycle analysis previously prepared for the given product as retrieved from the distributed ledger, as well as an option to view the various tracked inputs that led to the given life-cycle analysis results (e.g., the display may be updated such that various steps in the life of the product to this point may be shown, as retrieved from the blockchain).

In some embodiments, users (e.g., owners of one or more goods produced as discussed herein) may have an account, digital wallet, or other mechanism that allows them to claim ownership of carbon-credits uniquely associated with the production of goods purchased by the users. The users may claim ownership of the carbon-credits by providing the product identifiers of goods they have purchased (e.g., as described in connection with FIG. 4A) and by providing suitable account or identification information such as a digital wallet identifier (or suitable information that identifies a third party beneficiary, such as a non-profit organization). After a user claims ownership of the carbon-credits, ownership of the proper amount of carbon-credits may be transferred to the user, such as by adding a record of the carbon-credits in a digital wallet of the user and making a corresponding record in the blockchain and/or making a corresponding deduction from a digital wallet of a producer or fabricator (who may temporarily hold such carbon-credits in their digital wallets until claimed by users).

A user interface may enable a user to claim ownership of a given product having a product identifier provided by the user via the user interface, which may be used in connection with functionality that enables a finder of the product to have the product returned to the owner. In some embodiments, data stored in association with the user's account or digital wallet may include the user's name and/or contact information (such as an email address, mailing address, phone number, and/or other information). Alternatively, the user claiming ownership of a product having a certain product identifier may provide limited contact information to be used for "lost and found" purposes, without setting up an account. In some embodiments, the owner's contact information may be added to a private entry in the blockchain in association with the given product identifier. In other embodiments, an account identifier of the owner may be stored in the blockchain in association with the given product identifier, where a separate database may securely store the contact information, name and/or other account information associated with the account identifier.

In some embodiments, if an individual finds a lost item bearing a certain product identifier, the finder of the item may access a webpage, application or other user interface to initiate a process to return the item to its rightful owner based on information stored in the blockchain. For example, a system may receive, via interactions with a user interface, a lost item indication, where the lost item indication may include either an indication from the owner that the owner lost the item, or an indication from an individual other than the owner indicating that the individual found the item. In response to the lost item indication, the system may initiate an automated action to aid in return of the item to the owner. The automated action may include sending an electronic communication to the owner or the individual who found the item. For example, the system may contact the owner using the owner's last provided contact information and either seek approval to send the owner's contact information to the finder of the item, or may provide contact information of the finder to the owner. Alternatively, the finder may be provided with instructions to return the item via an intermediary service in a manner that shields contact information and identity of the true owner from the finder of the item.

Figure 5:
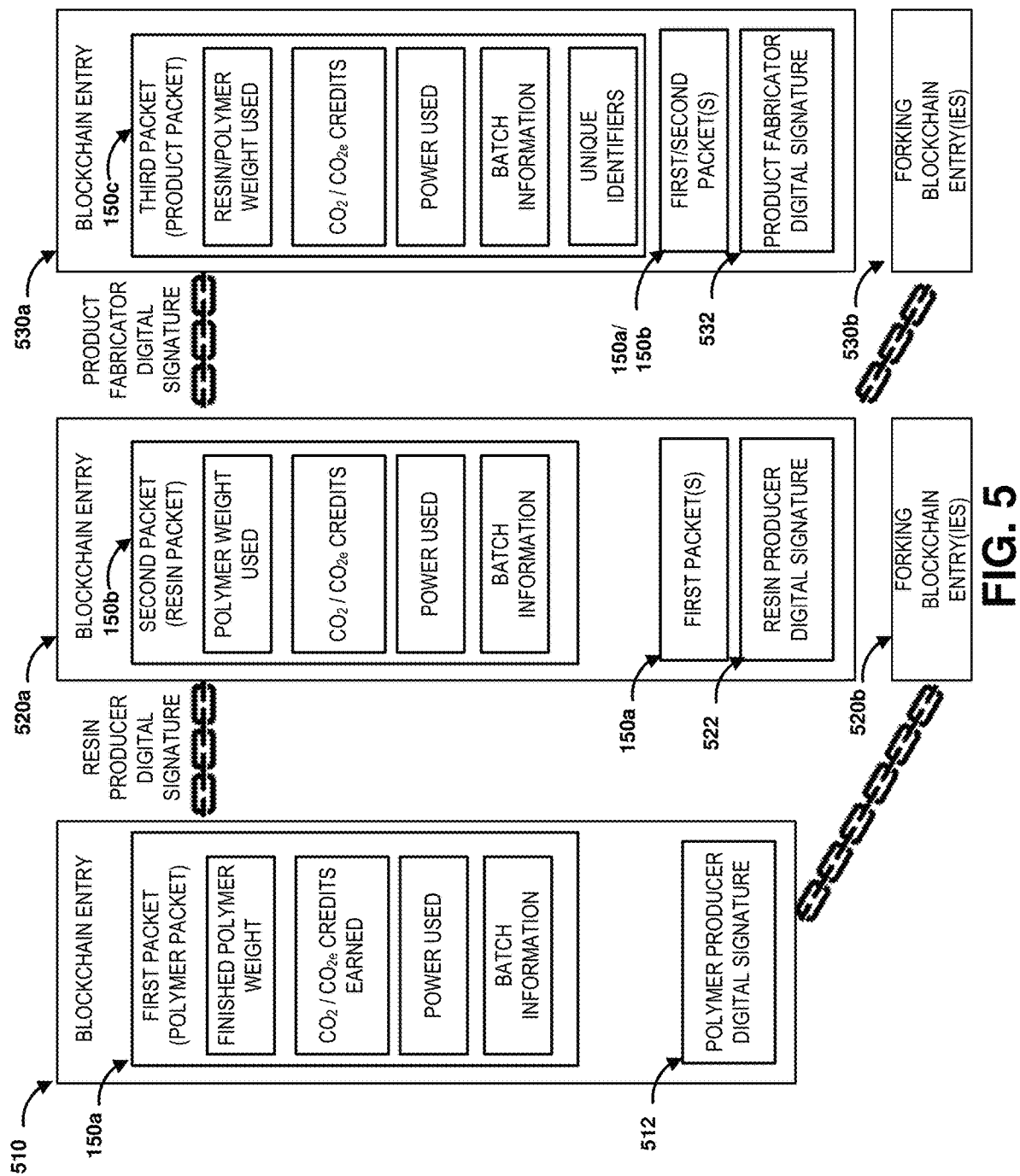
FIG. 5 shows illustrative blockchain entries in accordance with various embodiments of the present disclosure.

Examples of blockchain entries in a blockchain ledger, such as the blockchain 150, are shown in FIG. 5. Blockchain entry 510 may include a polymer packet such as first packet 150a of FIG. 1A. As shown in FIG. 5, entry 510 may include the first packet 150a plus a digital signature 512 from the polymer producer and/or from sensors at the polymer producer. The first packet 150a may include, as examples, a finished polymer weight, an amount of carbon-credits (or carbon-equivalent credits) earned, the amount of power consumed by production of the polymer, and batch identification information. The digital signature 512 may be created by digitally signing the first packet 150a with one or more private keys associated the producer and/or sensors at the producer.

Upon conversion of the polymer into a resin, a resin packet such as second packet 150b of FIG. 1B may be recorded via blockchain entry 520a. As shown in FIG. 5, entry 520a may include the second packet 150b, the associated first packet 150a, plus a digital signature 522 from the resin producer and/or from sensors at the resin producer. The second packet 150b may include, as examples, a weight of polymer used, the amount of power used, an amount of carbon-credits associated with the produced resin, and batch identification information. The digital signature 522 may be created by digitally signing the second packet 150b with one or more private keys associated the producer and/or sensors at the producer. If desired, the first packet 150a may also be digitally signed to produce the digital signature 522. With arrangements of this type, blockchain entry 520a may be tied to blockchain entry 510 in the blockchain. Thus, any person inspecting the blockchain would be able to track how a batch of polymer was converted into resin (and eventually products), thus also allowing tracking and proportional division of carbon-credits from polymer to resin (and eventually products).

A single blockchain entry 510 may be created for each batch of polymer produced, but each batch of polymer may be split into multiple batches of resin. Thus, FIG. 5 illustrates a fork in the blockchain ledger, where one portion of a batch of polymer is converted into a first batch of resin and recorded via entry 520a and another portion of the same batch of polymer is converted into a second batch of resin and recorded via entry 520b. In still other embodiments (not pictured), multiple batches of polymer are combined into a single batch of resin, thus resulting in a merger of two polymer entries 510 into a single resin entry 520a.

Upon conversion of the resin into products, a product packet such as third packet 150c of FIG. 1C may be recorded via blockchain entry 530a. As shown in FIG. 5, entry 530a may include the third packet 150c, the associated second packet 150b, the associated first packet 150a, plus a digital signature 532 from the product manufacturer and/or from sensors at the product manufacturer. The third packet 150c may include, as examples, a weight of polymer and/or resin used, the amount of power used in production of the products, an amount of carbon-credits associated with the produced products (e.g., an aggregate amount that can later be divided by a unit count or a per-product amount), batch identification information, a unit count, and a listing of unique product identifiers. In some embodiments, the split or division of the aggregate amount of carbon credits to the various associated unit counts may occur by execution of a smart contract on the blockchain that applies predetermined mathematical operations on data obtained from the blockchain. The digital signature 532 may be created by digitally signing the third packet 150c with one or more private keys associated with the product manufacturer and/or sensors at the manufacturer. If desired, the first packet 150a and/or the second packet 150b may also be digitally signed to produce the digital signature 522. With arrangements of this type, blockchain entry 530a may be tied to blockchain entries 510 and 520a in the blockchain. Thus, any person inspecting the blockchain (such as an auditor) would be able to track a given product back to the intermediate batch of resin and the original batch of polymer, thus also allowing tracking and proportional division of carbon-credits from polymer to product.

As previously noted, a single blockchain entry 510 may be created for each batch of polymer produced, but each batch of polymer may be split into multiple batches of resin. Alternatively or additionally, each batch of resin may be split into multiple batches of products. Thus, FIG. 5 illustrates a fork in the blockchain ledger, where one portion of a batch of resin is converted into a first batch of products and recorded via entry 530a and another portion of the same batch of resins is converted into a second batch of products and recorded via entry 530b (e.g., a forking blockchain entry). In still other embodiments (not pictured), multiple batches of resin can be combined into a single batch of products, thus resulting in a merger of two resin entries 520a, 520b into a single product entry 530a.

Figure 6:
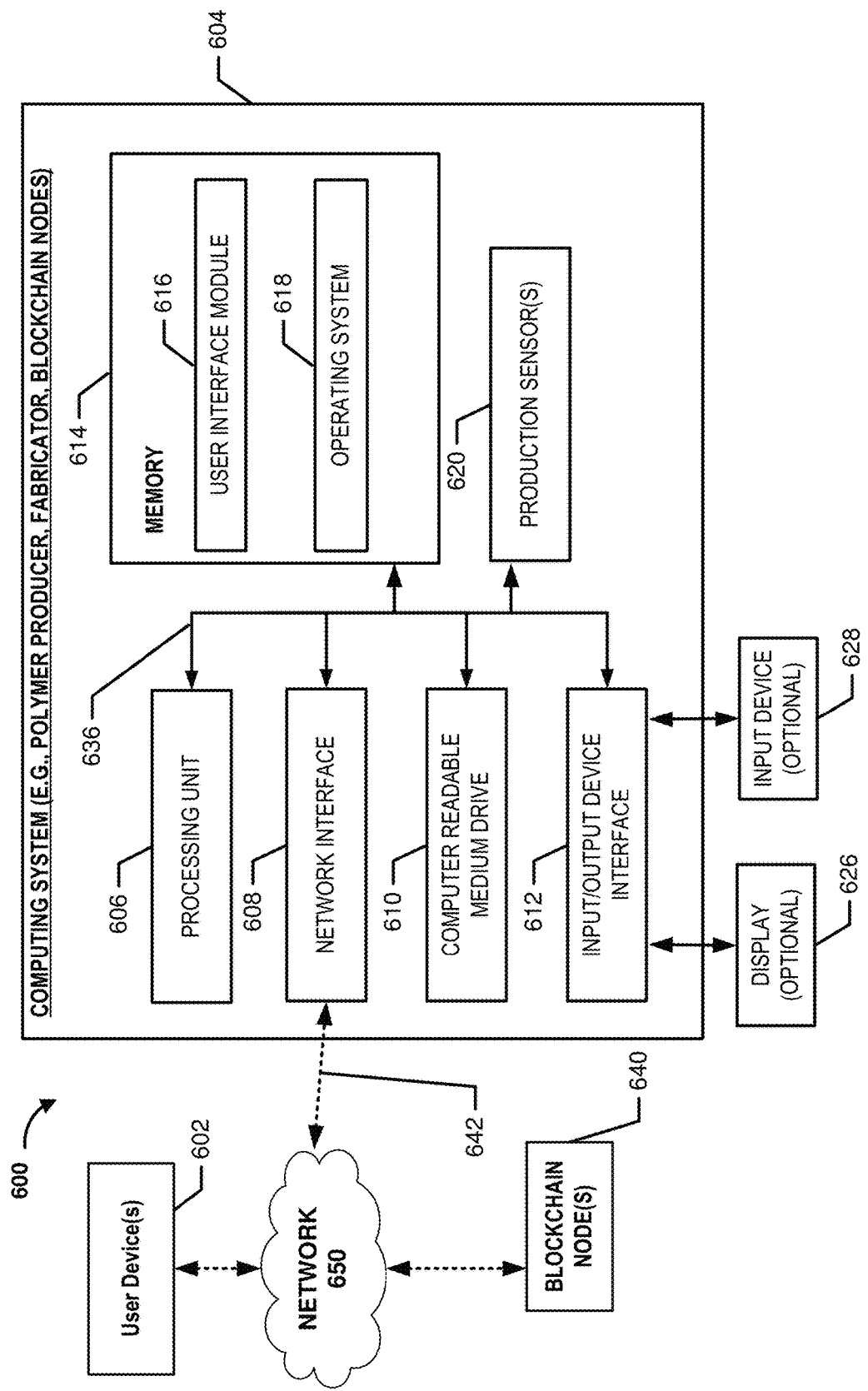
FIG. 6 is a system block diagram of a computing environment suitable for use in various embodiments of the present disclosure.

FIG. 6 illustrates a general architecture of a computing environment 600 in which aspects of the present disclosure may be implemented, according to some embodiments. As depicted in FIG. 6, the computing environment 600 may include a computing system 604. The general architecture of the computing system 604 may include an arrangement of computer hardware and software components used to implement aspects of the present disclosure. The computing system 604 may include many more (or fewer) elements than those shown in FIG. 6. It is not necessary, however, that all of these generally conventional elements be shown in order to provide an enabling disclosure.

As illustrated, the computing system 604 includes a processing unit 606, a network interface 608, a computer readable medium drive 610, an input/output device interface 612, a display 626, and an input device 628, all of which may communicate with one another by way of a communication bus 636. The processing unit 606 may communicate to and from memory 614 and may provide output information for the display 626 via the input/output device interface 612. The input/output device interface 612 may also accept input from the input device 628, such as a keyboard, mouse, digital pen, microphone, touch screen, gesture recognition system, voice recognition system, or other input device known in the art.

The memory 614 may contain computer program instructions (grouped as modules or components in some embodiments) that the processing unit 606 may execute in order to implement one or more embodiments described herein. The memory 614 may generally include RAM, ROM and/or other persistent, auxiliary or non-transitory computer-readable media. The memory 614 may store an operating system 618 that provides computer program instructions for use by the processing unit 606 in the general administration and operation of the computing system 604. The memory 614 may further include computer program instructions and other information for implementing aspects of the present disclosure. For example, in one embodiment, the memory 614 may include a user interface module 616 that generates user interfaces (and/or instructions therefor) for display upon a computing system, e.g., via a navigation interface such as a browser or application installed on the computing system 604 or user devices 602.

In some embodiments, the network interface 608 may provide connectivity to one or more networks or computing systems, and the processing unit 606 may receive information and instructions from other computing systems or services via one or more networks. In the example illustrated in FIG. 6, the network interface 608 may be in communication with one or more user devices 602 and with one or more blockchain nodes 640 via the network 650, such as the Internet. In particular, the computing system 604 may establish a communication link 642 with a network 650 (e.g., using known protocols) in order to send communications to the over the network. Similarly, the user devices 602 and the blockchain nodes 640 may send communications to the computing system 604 over the network 650 via wired or wireless communication links. The user devices 602 and the blockchain nodes 640 may include similar hardware to that illustrated as being included in computing system 604, such as a processing unit, network interface, memory, operating system, etc.

In some embodiments, the computing system 604 may be a computing system associated with tracking production of carbon-sequestering materials, such as polymers, and recording blockchain entries associated with production of the materials and recording carbon-credits associated with the materials. In other embodiments, the computing system 604 may be a computing system associated with tracking production of an intermediate product, such as resin, from a carbon-sequestering material, such as polymer, and recording blockchain entries that associate the intermediate product with carbon-credits associated with the materials. In still other embodiments, the computing system 604 may be a computing system associated with tracking fabrication of products from carbon-sequestering materials (or from intermediate products) and recording blockchain entries that associate the products with carbon-credits associated with the materials (e.g., recording blockchain entries that include a unique product identifier to uniquely identify each product with an associated amount of carbon-credits). In yet other embodiments, the computing system 604 may be a blockchain node in a set of blockchain nodes maintaining a blockchain ledger or may be a user device used in accessing blockchain entries (e.g., used in determining an amount of carbon-credit associated with one or more uniquely identified products).

Example data packets will now be described with respect to certain embodiments. In one embodiment. Specifically, the following includes brief examples regarding a finished polymer packet (such as packet 150a), a finished materials packet (such as packet 150b), and a finished product packet (such as packet 150c). In some embodiments, each of these packets may be sent over a network using an HTTP POST method, and may be formatted in a JavaScript Object Notation (JSON) or similar format. Each JSON file or packet may include both a portion storing labelled data (such as a series of key/value pairs) and a signature portion comprising, for example, a Base64 serialized signature.

A finished polymer data packet may be sent after a run's finished dry weight has been measured. The sending may be triggered by personnel or an automated system measuring the dry weight of material, which may be captured from a scale device with date and time information. The data portion of the JSON file for a finished polymer data packet may include, in one example instance, the following key/value pairs: "start_date": 5/23/19 14:25:43-700; "end_date": 5/25/19 14:25:42-700; "run_id": "18058723A-E2"; "co2_lot_number": "18054"; "co2_source": "source92"; "co2_in": 3452 cfm/kgs; "co2_out": 2342 cfm/kgs; "manufacture_location": "22.3292, −21.32"; "dry_weight": 234 kg; "weight_measured_by": "user921"; "dry_weight_date": 5/25/19 14:25:42-700; "power_consumed": 10.4 kW; "carbon_credit_number": "180105-AA"; "carbon_credit_approval_date": "105-AA".

A finished materials data packet may be sent after material has been made and shipped to fabricator. The trigger for sending may be that a material team or entity has shipped new material to a fabricator. The data portion of the JSON file for a finished materials data packet may include, in one example instance, the following key/value pairs: "run_ids": ["1803A-E2", "18012A-E2", "1723A-E2"]; "material_type": "cell phone case"; "material_id": "180405-AA"; "fabricator": "fab1482"; "ship_date": 5/23/19 14:25:43-700; "unit_count": 150; "unit_ids": ["b106df9e-9cd", "f451fe72-964d", "af225c06-9264-4311-81", "a954d442-4cc2-43cc-a", "7ffb06da-2399-4ebd-a2"].

A finished product data packet may be sent after receiving one or more finished products back from a fabricator, and the units are scanned back in and carbon credits per unit are calculated. The data portion of the JSON file for a finished product data packet may include, in one example instance, the following key/value pairs: "product_type": "cell phone case"; "product_id": "180405-AA"; "carbon_credit_per_unit": 10; "receive_date": 5/23/19 14:25:43-700; "scanned_unit_count": 150; "scanned_unit_ids": ["b106df9e-9cd", "f451fe72-964d", "af225c06-9264-4311-81", "a954d442-4cc2-43cc-a", "7ffb06da-2399-4ebd-a2"]. Some example enumerated embodiments of the present disclosure are recited below in the form of methods and systems. It will be appreciated that non-transitory computer readable media may store computer-executable instructions that cause a computing system executing the instructions to perform any of the below methods. Additionally, any of the methods recited below could be implemented by a computing system that includes memory and a processor configured to execute instructions that cause the computing system to perform the steps of the below methods.

In one embodiment, a first computer-implemented method may include receiving from a remote computing device, by a first computing node among a plurality of computing nodes that each host a copy of a distributed ledger, a first data packet comprising information regarding carbon sequestered during production of a batch of raw material, where the first data packet is assembled by the remote computing device based on production data recorded in an automated process via communication between the remote computing device and a plurality of physical sensors, where the first data packet comprises information including at least (a) an amount of carbon prevented from entering the atmosphere when producing the batch of raw material, and (b) an amount of power used in producing the batch of raw material; storing in the distributed ledger, by the first computing node, a first ledger entry that includes the information from the first data packet and an associated batch identifier, where the first ledger entry identifies an amount of carbon credit associated with the batch of raw material; receiving, by at least the first computing node, the batch identifier and a second data packet that includes information regarding fabrication associated with at least part of the batch of raw material, where the second data packet comprises at least a unit count of units produced from the at least part of the batch of raw material; in response to receiving the second data packet, retrieving the amount of carbon credit associated with the at least part of the batch of raw material from the distributed ledger, and splitting the amount of carbon credit based on the unit count to generate a per-unit carbon credit; storing, in the distributed ledger, one or more additional ledger entries associating the per-unit carbon credit with each of a plurality of unique product identifiers; sending, to at least a second remote computing device, at least a subset of the plurality of unique product identifiers to each be uniquely assigned to a different physical product produced from the raw material; and in response to a request, from a third remote computing device, for carbon credit information associated with a first unique physical product having a first unique product identifier from the plurality of unique product identifiers: identifying a matching entry, amongst the one or more additional ledger entries, for the first unique product identifier in the distributed ledger, and sending, to the third remote computing device, an indication of a verified amount of the per-unit carbon credit uniquely associated with the first unique physical product.

In various embodiments, the above first method may further include one or more of the following steps or features. The raw material may be or include a polymer. The raw material may be or include a protein. The amount of carbon credit associated with the batch of raw material may be determined based at least on (a) the amount of carbon prevented from entering the atmosphere when producing the batch of raw material and (b) the amount of power used in producing the batch of raw material. The receiving from the remote computing device of the first data packet may include receiving from the remote computing device the first data packet along with a digital signature generated with a private key of the remote computing device. The storing, in the distributed ledger, of the one or more additional ledger entries associating the per-unit carbon credit with each of the plurality of unique product identifiers may include storing the plurality of unique product identifiers in the distributed ledger.

In various embodiments, the above first method may further include one or more of the following steps or features. Storing, in the distributed ledger, the one or more additional ledger entries associating the per-unit carbon credit with each of the plurality of unique product identifiers may include linking the one or more additional ledger entries to the first ledger entry in the distributed ledger. The one or more additional ledger entries may include at least a portion of the first ledger entry or include an identification of the first ledger entry such that the one or more additional ledger entries are permanently linked to the first ledger entry in the distributed ledger. The plurality of physical sensors may include a sensor that measures a weight of a polymer in the batch of raw material, and the first data packet may include the weight of the polymer. The plurality of physical sensors may include a sensor that measures an amount of greenhouse gas incorporated into the raw material in the batch of raw material. The plurality of physical sensors may include a sensor that measures an amount of greenhouse gas incorporated into the raw material in the batch of raw material, and the amount of carbon prevented from entering the atmosphere when producing the batch of raw material may be determined based on the measured amount of greenhouse gas incorporated into the raw material. The plurality of unique product identifiers may include a plurality of unique alpha-numeric codes. The plurality of unique product identifiers may incude a plurality of QR codes, and the request from the third remote computing device for carbon credit information associated with the first unique physical product may include the first unique product identifier as determined by the third remote computing device from an image of a QR code captured by a camera of the third remote computing device.

In one embodiment, a second computer-implemented method may include receiving from a remote computing device, by a first computing node among a plurality of computing nodes that each host a copy of a distributed ledger, a first data packet comprising information regarding an environment attribute generated as a result of the production of a physical product, where the first data packet is assembled by the remote computing device based on production data recorded in an automated process via communication between the remote computing device and a plurality of physical sensors or data inputs, where the first data packet comprises information including at least (a) an amount of carbon that would otherwise be in the air in the absence of the production of the physical product, (b) the water, energy, labor, or other input that would have been utilized in the absence of the production of the physical product, or (c) a other quantifiable environmental or social improvement from the baseline created as a result of the production of the physical product; storing in the distributed ledger, by the first computing node, a first ledger entry that includes the information from the first data packet and an associated batch identifier, where the first ledger entry identifies a quantifiable environmental or social improvement from the baseline associated with the physical product; receiving, by at least the first computing node, the batch identifier and a second data packet that includes information regarding fabrication associated with at least part of the batch of raw material, where the second data packet comprises at least a unit count of units produced from the at least part of the batch of raw material; in response to receiving the second data packet: retrieving the amount of environmental or social improvement associated with the at least part of the batch of raw material from the distributed ledger, and splitting the amount of environmental or social improvement based on the unit count to generate a per-unit environmental or social improvement credit; storing, in the distributed ledger, one or more additional ledger entries associating the per-unit environmental or social improvement credit with each of a plurality of unique product identifiers; sending, to at least a second remote computing device, at least a subset of the plurality of unique product identifiers to each be uniquely assigned to a different physical product produced from the raw material; and in response to a request, from a third remote computing device, for environmental or social improvement information associated with a first unique physical product having a first unique product identifier from the plurality of unique product identifiers: identifying a matching entry, amongst the one or more additional ledger entries, for the first unique product identifier in the distributed ledger, and sending, to the third remote computing device, an indication of a verified amount of the per-unit environmental or social improvement credit uniquely associated with the first unique physical product.

In various embodiments, the above second method may further include one or more of the following steps or features. The method may include sending, to a computing system associated with a life-cycle analysis provider, information retrieved from a plurality of ledger entries associated with at least one unique product identifier; and receiving, from the computing system associated with the life-cycle analysis provider, results of a life-cycle analysis performed by the life-cycle analysis provider with respect to a product identified by the at least one unique product identifier, where the life-cycle analysis is based on environmental impacts associated with a life of the product as determined from the information included in the plurality of ledger entries associated with the at least one unique product identifier. The method may include storing in the distributed ledger, by the first computing node, a new ledger entry that associates the results of the life-cycle analysis with the at least one unique product identifier. The at least one unique product identifier associated with the life-cycle analysis may be the first unique product identifier included in the request from the third remote computing device, and the method may further include, in response to the request from the third remote computing device, sending, to the third remote computing device, the results of the life-cycle analysis for the first unique product identifier as retrieved from the distributed ledger.

In various embodiments, the above second method may further include one or more of the following steps or features. The method may further include receiving, from the third remote computing device, a name and contact information of an owner of the first unique physical product; and storing in the distributed ledger, by the first computing node, a new ledger entry that associates the name and contact information with the first unique product identifier. The method may include receiving a lost item indication, where the lost item indication comprises one of (a) an indication from the owner that the owner lost the first unique physical product, or (b) an indication from an individual other than the owner indicating that the individual found the first unique physical product; and in response to the lost item indication, initiating an automated action to aid in return of the item to the owner, where the automated action may include sending an electronic communication to at least one of the owner or the individual.

In another embodiment, a computing system operating as a first computing node among a plurality of computing nodes that each host one or more copies of a distributed ledger may include a non-transitory data store that stores a first copy of the distributed ledger; and at least one computing device configured with computer-executable instructions that, when executed, cause the at least one computing device to: receive from a remote computing device, a first data packet comprising information regarding carbon sequestered during production of a batch of raw material, where the first data packet is assembled by the remote computing device based on production data recorded in an automated process via communication between the remote computing device and a plurality of physical sensors, where the first data packet comprises information including at least (a) an amount of carbon prevented from entering the atmosphere when producing the batch of raw material, and (b) an amount of power used in producing the batch of raw material; store in at least the first copy of the distributed ledger, a first ledger entry that includes the information from the first data packet and an associated batch identifier, where the first ledger entry identifies an amount of carbon credit associated with the batch of raw material; receive the batch identifier and a second data packet that includes information regarding fabrication associated with at least part of the batch of raw material, where the second data packet comprises at least a unit count of units produced from the at least part of the batch of raw material; in response to receiving the second data packet: retrieve the amount of carbon credit associated with the at least part of the batch of raw material from the distributed ledger, and split the amount of carbon credit based on the unit count to generate a per-unit carbon credit; store, in at least the first copy of the distributed ledger, one or more additional ledger entries associating the per-unit carbon credit with each of a plurality of unique product identifiers; send, to at least a second remote computing device, at least a subset of the plurality of unique product identifiers to each be uniquely assigned to a different physical product produced from the raw material; and in response to a request, from a third remote computing device, for carbon credit information associated with a first unique physical product having a first unique product identifier from the plurality of unique product identifiers: identify a matching entry, amongst the one or more additional ledger entries, for the first unique product identifier in the distributed ledger; and send, to the third remote computing device, an indication of a verified amount of the per-unit carbon credit uniquely associated with the first unique physical product, where the verified amount is obtained from the matching entry in the distributed ledger.

In order to store, in at least the first copy of the distributed ledger, the one or more additional ledger entries associating the per-unit carbon credit with each of the plurality of unique product identifiers, the at least one computing device above may be further configured to link the one or more additional ledger entries to the first ledger entry in at least the first copy of the distributed ledger. In other embodiments, the above system may be configured to implement any of the steps described with respect to the first and second methods above and the associated features, as well as any of the additional features or steps described above as additional features or steps that may be combined with those methods.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer implemented method comprising:
    receiving from a remote computing device, by a first computing node among a plurality of computing nodes that each host a copy of a distributed ledger, a first data packet comprising information regarding carbon sequestered during production of a batch of raw material, wherein the first data packet is assembled by the remote computing device based on production data recorded in an automated process via communication between the remote computing device and a plurality of physical sensors, wherein the first data packet comprises information including at least (a) an amount of carbon prevented from entering the atmosphere when producing the batch of raw material, and (b) an amount of power used in producing the batch of raw material, wherein the first data packet comprises cryptographic signatures that are each associated with a different individual sensor of the plurality of physical sensors;
    storing in the distributed ledger, by the first computing node, a first ledger entry that includes the information from the first data packet and an associated batch identifier, wherein the first ledger entry identifies an amount of carbon credit associated with the batch of raw material, wherein the first ledger entry comprises a first cryptographic signature generated using a private key of a producer of the raw material;
    receiving, by at least the first computing node, the batch identifier and a second data packet that includes information regarding fabrication associated with at least part of the batch of raw material, wherein the second data packet comprises at least a unit count of units produced from the at least part of the batch of raw material;
    in response to receiving the second data packet:
        retrieving the amount of carbon credit associated with the at least part of the batch of raw material from the distributed ledger;
        splitting the amount of carbon credit based on the unit count to generate a per-unit carbon credit; and
        storing, in the distributed ledger, one or more additional ledger entries associating the per-unit carbon credit with each of a plurality of unique product identifiers, wherein each of the one or more additional ledger entries comprises (i) a reference to the first ledger entry that associates one or more product identifiers with the raw material referenced in the first ledger entry, and (ii) a second cryptographic signature that is generated using a private key of a product fabricator or manufacturer that produced the units produced from the at least part of the batch of raw material;
    sending, to at least a second remote computing device, at least a subset of the plurality of unique product identifiers to each be uniquely assigned to a different physical product produced from the raw material; and
    in response to a request, from a third remote computing device, for carbon credit information associated with a first unique physical product having a first unique product identifier from the plurality of unique product identifiers:
        identifying a matching entry, amongst the one or more additional ledger entries, for the first unique product identifier in the distributed ledger; and
        sending, to the third remote computing device, an indication of a verified amount of the per-unit carbon credit uniquely associated with the first unique physical product.

2. The method of claim 1, wherein the raw material comprises a polymer.

3. The method of claim 1, wherein the raw material comprises a protein.

4. The method of claim 1, wherein the amount of carbon credit associated with the batch of raw material is determined based at least on (a) the amount of carbon prevented from entering the atmosphere when producing the batch of raw material and (b) the amount of power used in producing the batch of raw material.

5. The method of claim 1, wherein receiving, from the remote computing device, the first data packet comprises receiving from the remote computing device the first data packet along with the first cryptographic signature.

6. The method of claim 1, wherein storing, in the distributed ledger, the one or more additional ledger entries associating the per-unit carbon credit with each of the plurality of unique product identifiers comprises storing the plurality of unique product identifiers in the distributed ledger.

7. The method of claim 1, wherein storing, in the distributed ledger, the one or more additional ledger entries associating the per-unit carbon credit with each of the plurality of unique product identifiers comprises linking the one or more additional ledger entries to the first ledger entry in the distributed ledger.

8. The method of claim 1, wherein the one or more additional ledger entries include at least a portion of the first ledger entry or include an identification of the first ledger entry such that the one or more additional ledger entries are permanently linked to the first ledger entry in the distributed ledger.

9. The method of claim 1, wherein the plurality of physical sensors comprises a sensor that measures a weight of a polymer in the batch of raw material and wherein the first data packet includes the weight of the polymer.

10. The method of claim 1, wherein the plurality of physical sensors comprises a sensor that measures an amount of greenhouse gas incorporated into the raw material in the batch of raw material.

11. The method of claim 1, wherein the plurality of physical sensors comprises a sensor that measures an amount of greenhouse gas incorporated into the raw material in the batch of raw material and wherein the amount of carbon prevented from entering the atmosphere when producing the batch of raw material is determined based at least on the measured amount of greenhouse gas incorporated into the raw material.

12. The method of claim 1, wherein the plurality of unique product identifiers comprises a plurality of unique alphanumeric codes.

13. The method of claim 1, wherein the plurality of unique product identifiers comprises a plurality of QR codes, and wherein the request from the third remote computing device for carbon credit information associated with the first unique physical product includes the first unique product identifier as determined by the third remote computing device from an image of a QR code captured by a camera of the third remote computing device.

14. A computer-implemented method comprising:
receiving from a remote computing device, by a first computing node among a plurality of computing nodes that each host a copy of a distributed ledger, a first data packet comprising information regarding an environment attribute generated as a result of the production of a physical product, wherein the first data packet is assembled by the remote computing device based on production data recorded in an automated process via communication between the remote computing device and a plurality of physical sensors or data inputs, wherein the first data packet comprises information including at least (a) an amount of carbon that would otherwise be in the air in the absence of the production of the physical product, (b) the water, energy, labor, or other input that would have been utilized in the absence of the production of the physical product, or (c) a other quantifiable environmental or social improvement from the baseline created as a result of the production of the physical product, wherein the first data packet comprises cryptographic signatures that are each associated with a different individual sensor of the plurality of physical sensors;
storing in the distributed ledger, by the first computing node, a first ledger entry that includes the information from the first data packet and an associated batch identifier, wherein the first ledger entry identifies a quantifiable environmental or social improvement from the baseline associated with the physical product, wherein the first ledger entry comprises a first cryptographic signature generated using a private key of a producer of the physical product;
receiving, by at least the first computing node, the batch identifier and a second data packet that includes information regarding fabrication associated with at least part of the batch of raw material, wherein the second data packet comprises at least a unit count of units produced from the at least part of the batch of raw material;
in response to receiving the second data packet:
retrieving the amount of environmental or social improvement associated with the at least part of the batch of raw material from the distributed ledger;
splitting the amount of environmental or social improvement based on the unit count to generate a per-unit environmental or social improvement credit; and
storing, in the distributed ledger, one or more additional ledger entries associating the per-unit environmental or social improvement credit with each of a plurality of unique product identifiers, wherein each of the one or more additional ledger entries comprises (i) a reference to the first ledger entry that associates one or more product identifiers with the physical product referenced in the first ledger entry, and (ii) a second cryptographic signature that is generated using a private key of a fabricator associated with the at least part of the batch of raw material;
sending, to at least a second remote computing device, at least a subset of the plurality of unique product identifiers to each be uniquely assigned to a different physical product produced from the raw material; and
in response to a request, from a third remote computing device, for environmental or social improvement information associated with a first unique physical product having a first unique product identifier from the plurality of unique product identifiers:
identifying a matching entry, amongst the one or more additional ledger entries, for the first unique product identifier in the distributed ledger; and
sending, to the third remote computing device, an indication of a verified amount of the per-unit environmental or social improvement credit uniquely associated with the first unique physical product.

15. The method of claim 14 further comprising:
sending, to a computing system associated with a life-cycle analysis provider, information retrieved from a plurality of ledger entries associated with at least one unique product identifier; and
receiving, from the computing system associated with the life-cycle analysis provider, results of a life-cycle analysis performed by the life-cycle analysis provider with respect to a product identified by the at least one unique product identifier, wherein the life-cycle analysis is based on environmental impacts associated with a life of the product as determined from the information included in the plurality of ledger entries associated with the at least one unique product identifier.

16. The method of claim 15 further comprising:
storing in the distributed ledger, by the first computing node, a new ledger entry that associates the results of the life-cycle analysis with the at least one unique product identifier.

17. The method of claim 16, wherein the at least one unique product identifier associated with the life-cycle analysis is the first unique product identifier included in the request from the third remote computing device, and wherein the method further comprises:
in response to the request from the third remote computing device, sending, to the third remote computing device, the results of the life-cycle analysis for the first unique product identifier as retrieved from the distributed ledger.

18. The method of claim 14 further comprising:
receiving, from the third remote computing device, a name and contact information of an owner of the first unique physical product; and
storing in the distributed ledger, by the first computing node, a new ledger entry that associates the name and contact information with the first unique product identifier.

19. The method of claim 18 further comprising:
receiving a lost item indication, wherein the lost item indication comprises one of (a) an indication from the owner that the owner lost the first unique physical product, or (b) an indication from an individual other than the owner indicating that the individual found the first unique physical product; and
in response to the lost item indication, initiating an automated action to aid in return of the item to the owner, wherein the automated action comprises sending an electronic communication to at least one of the owner or the individual.

20. A computing system operating as a first computing node among a plurality of computing nodes that each host one or more copies of a distributed ledger, the computing system comprising:
a non-transitory data store that stores a first copy of the distributed ledger; and
at least one computing device configured with computer-executable instructions that, when executed, cause the at least one computing device to:
receive from a remote computing device, a first data packet comprising information regarding carbon sequestered during production of a batch of raw material, wherein the first data packet is assembled by the remote computing device based on production data recorded in an automated process via communication between the remote computing device and a plurality of physical sensors, wherein the first data packet comprises information including at least (a) an amount of carbon prevented from entering the atmosphere when producing the batch of raw material, and (b) an amount of power used in producing the batch of raw material, wherein the first data packet comprises cryptographic signatures that are each associated with a different individual sensor of the plurality of physical sensors;
store in at least the first copy of the distributed ledger, a first ledger entry that includes the information from the first data packet and an associated batch identifier, wherein the first ledger entry identifies an amount of carbon credit associated with the batch of raw material, wherein the first ledger entry comprises a first cryptographic signature generated using a private key of a producer of the raw material;
receive the batch identifier and a second data packet that includes information regarding fabrication associated with at least part of the batch of raw material, wherein the second data packet comprises at least a unit count of units produced from the at least part of the batch of raw material;
in response to receiving the second data packet:
retrieve the amount of carbon credit associated with the at least part of the batch of raw material from the distributed ledger;
split the amount of carbon credit based on the unit count to generate a per-unit carbon credit; and
store, in at least the first copy of the distributed ledger, one or more additional ledger entries associating the per-unit carbon credit with each of a plurality of unique product identifiers, wherein each of the one or more additional ledger entries comprises (i) a reference to the first ledger entry that associates one or more product identifiers with the raw material referenced in the first ledger entry, and (ii) a second cryptographic signature that is generated using a private key of a product fabricator or manufacturer that produced the units produced from the at least part of the batch of raw material;
send, to at least a second remote computing device, at least a subset of the plurality of unique product identifiers to each be uniquely assigned to a different physical product produced from the raw material; and
in response to a request, from a third remote computing device, for carbon credit information associated with a first unique physical product having a first unique product identifier from the plurality of unique product identifiers:
identify a matching entry, amongst the one or more additional ledger entries, for the first unique product identifier in the distributed ledger; and
send, to the third remote computing device, an indication of a verified amount of the per-unit carbon credit uniquely associated with the first unique physical product, wherein the verified amount is obtained from the matching entry in the distributed ledger.

21. The computing system of claim 20, wherein to store, in at least the first copy of the distributed ledger, the one or more additional ledger entries associating the per-unit carbon credit with each of the plurality of unique product identifiers, the at least one computing device is further configured to link the one or more additional ledger entries to the first ledger entry in at least the first copy of the distributed ledger.

* * * * *